US007896063B2

(12) United States Patent
Shimoyama

(10) Patent No.: US 7,896,063 B2
(45) Date of Patent: Mar. 1, 2011

(54) HEAT EXCHANGER STRUCTURE FOR BATTERY MODULE

(75) Inventor: Yoshiro Shimoyama, Inzai (JP)

(73) Assignees: Hyundai Motor Company, Seoul (KR); Hyundai Motor Japan R&D Center, Inzai, Chiba (JP); Kia Motors Corporation, Seoul (KR)

( * ) Notice: Subject to any disclaimer, the term of this patent is extended or adjusted under 35 U.S.C. 154(b) by 994 days.

(21) Appl. No.: 11/784,815

(22) Filed: Apr. 10, 2007

(65) Prior Publication Data
US 2008/0121380 A1    May 29, 2008

(30) Foreign Application Priority Data
Nov. 28, 2006    (KR) ...................... 10-2006-0118106

(51) Int. Cl.
F24H 3/02 (2006.01)
H01M 10/50 (2006.01)
H01M 2/00 (2006.01)

(52) U.S. Cl. ...................... 165/121; 429/120; 429/148
(58) Field of Classification Search ................ 429/120, 429/143, 148; 165/120, 121, 122
See application file for complete search history.

(56) References Cited
U.S. PATENT DOCUMENTS
6,448,741 B1 * 9/2002 Inui et al. .................... 320/107
6,541,154 B2    4/2003 Oogami et al.
7,261,974 B2 * 8/2007 Watanabe et al. ............ 429/120
2005/0153199 A1 * 7/2005 Yagi et al. .................... 429/148
2008/0107946 A1 * 5/2008 Gunji et al. ................... 429/31

FOREIGN PATENT DOCUMENTS
| JP | 10270095 | 10/1998 |
| JP | 2000133225 | 5/2000 |
| JP | 2001313091 | 11/2001 |
| KR | 20020017957 A | 3/2002 |

* cited by examiner

Primary Examiner—Jennifer K Michener
Assistant Examiner—Carlos Barcena
(74) Attorney, Agent, or Firm—Morgan, Lewis & Bockius LLP

(57) ABSTRACT

A fan blows air across a battery package, which includes battery modules in a holder. The holder includes fins, configured such that air contact areas of battery modules at an upstream part are smaller than those at a downstream part. The fins at the upstream part may be longer than those at the downstream part. Alternatively, fins at a first side of the battery modules may be longest at the upstream part. Fins at a second side may be shortest at the upstream part. An air channel between the fins and the battery modules narrows from the upstream part to the downstream part. The fins at the upstream part may be closer to corresponding battery modules than those at the downstream part. Each fin may define a substantially rectangular cross-section. Alternatively, each fin may have an inclined surface on an upstream side and/or a declined surface on a downstream side.

8 Claims, 6 Drawing Sheets

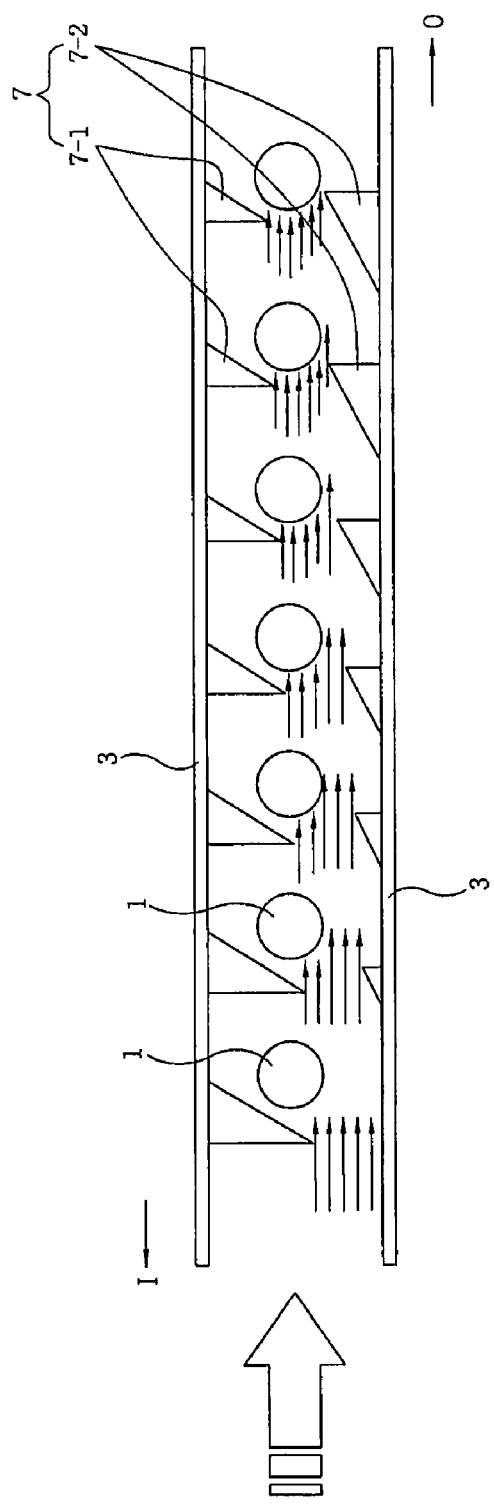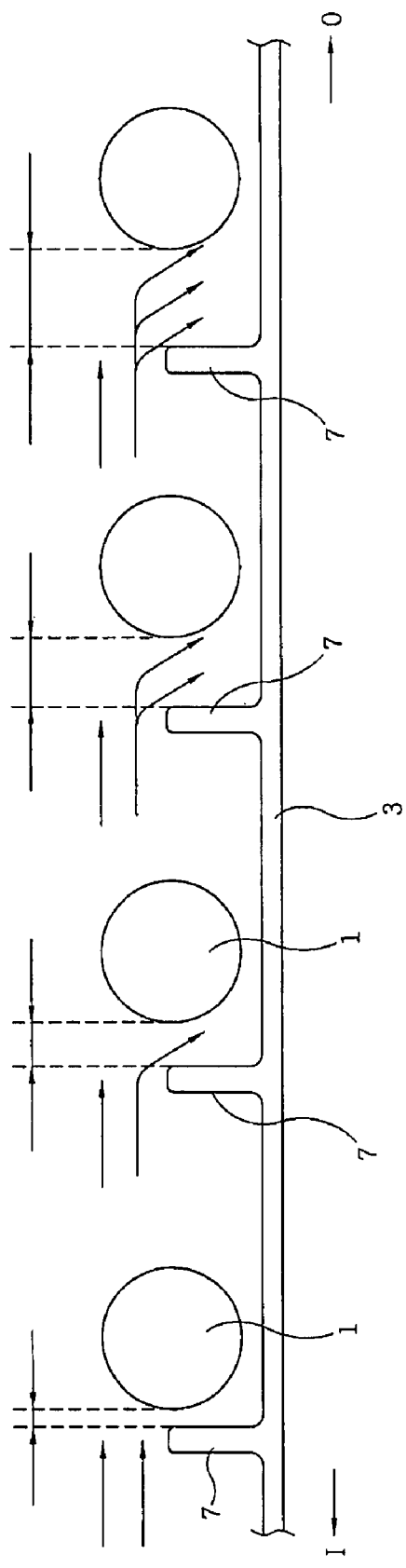

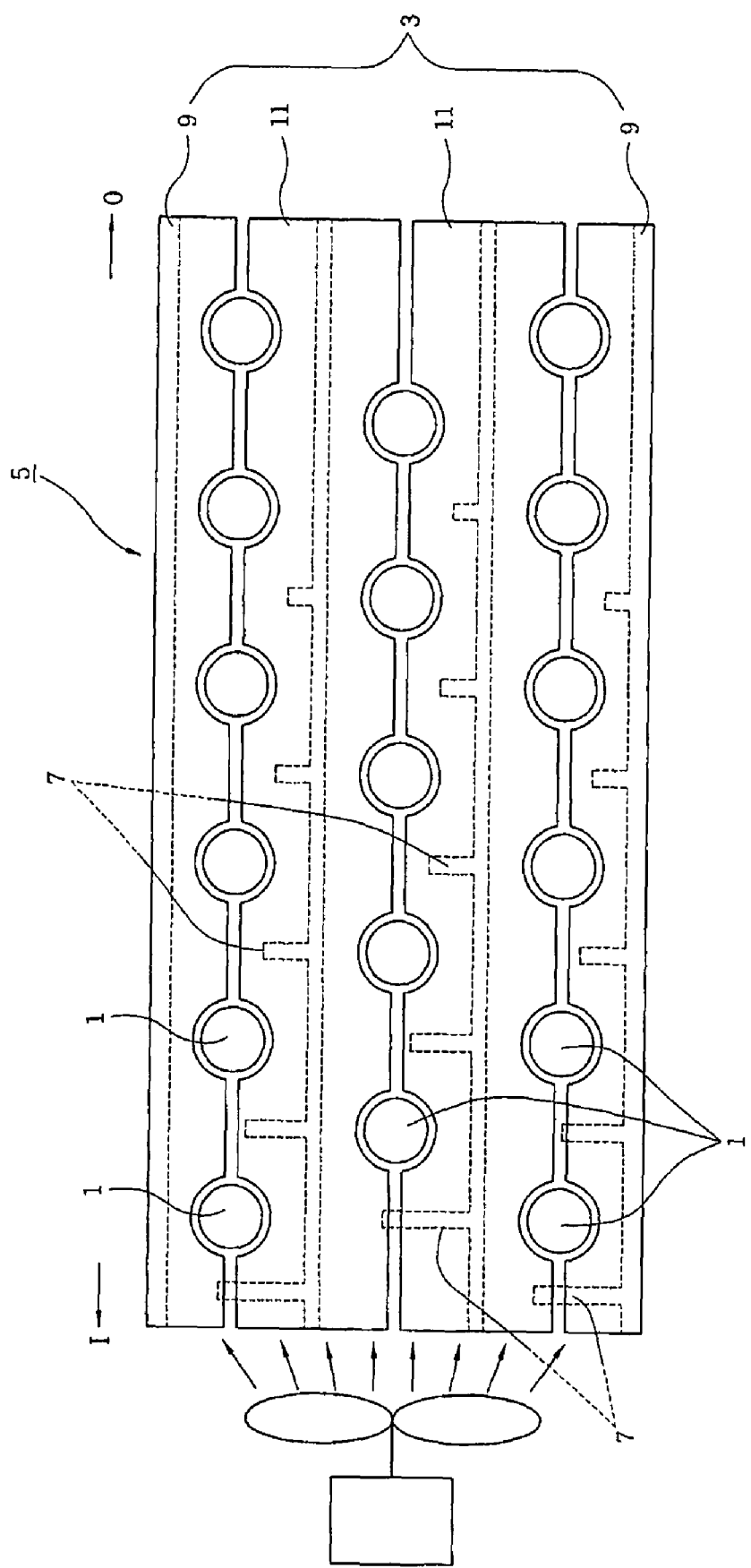

HEAT EXCHANGER STRUCTURE FOR BATTERY MODULE

CROSS-REFERENCE TO RELATED APPLICATIONS

The present application is based on, and claims priority to, Korean Application Serial Number 10-2006-0118106, filed on Nov. 28, 2006, the disclosure of which is hereby incorporated by reference herein in its entirety.

FIELD OF THE INVENTION

The present invention relates to a heat exchanger structure for battery modules.

BACKGROUND OF THE INVENTION

In general, a battery package is used in electric or hybrid-electric vehicles. A battery package includes several battery modules, disposed at regular intervals in a holder, and electrically and physically connected with each other.

The temperature of the battery modules increases during use. The modules are therefore cooled to prevent degradation of performance. In addition, since the battery modules do not smoothly operate at very low temperatures, such as in the winter, there is a need to heat them.

A fan is typically provided at either one or both sides of the battery package, and is used both for cooling and heating. However, the battery modules located nearest the fan are easily cooled or heated, whereas those located farther downstream are only slightly cooled or heated, because they exchange heat with the air that has already exchanged heat with those upstream.

SUMMARY OF THE INVENTION

A battery package includes battery modules disposed in a holder. A fan blows air from an upstream part to a downstream part of the battery package. The holder includes fins, configured such that an air contact area of the battery modules at the upstream part is smaller than an air contact area of the battery modules at the downstream part. The holder includes holder cover parts at outer surfaces of the battery package, and one or more intermediate holder parts disposed between the holder cover parts; the fins are disposed on the intermediate holder parts and/or the holder cover parts.

The lengths of the fins at the upstream part may be longer than the lengths of the fins at the downstream part.

Alternatively, a first set of fins, at a first side of the battery modules, may be longer at the upstream part than at the downstream part. A second set of fins, at a second side of the battery modules, may be shorter at the upstream part than at the downstream part. The lengths of the first set of fins are shorter than a distance from a first wall of the holder from which the first set of fins protrudes, to a far point of corresponding battery modules, but longer than a distance from the first wall to a near point of the corresponding battery modules. The second set of fins may be shorter than a distance from a second wall of the holder from which the second set of fins protrudes, to a near point of the corresponding battery modules. An air channel defined between the fins and the battery modules becomes gradually narrower from the upstream part to the downstream part.

The fins at the upstream part may be closer to corresponding battery modules than fins at the downstream part.

Each fin may define a substantially rectangular cross-section. Alternatively, each fin may have an inclined surface on an upstream side and/or a declined surface on a downstream side.

BRIEF DESCRIPTION OF THE DRAWINGS

For a better understanding of the nature and objects of the present invention, reference should be made to the following detailed description with the accompanying drawings, in which:

FIG. 4 is a sectional view of a heat exchanger structure for battery modules according to a second embodiment of the present invention;

FIG. 5 is a sectional view of a heat exchanger structure for battery modules according to a third embodiment of the present invention;

FIG. 10 is a sectional view of a heat exchanger according to a modification of the first embodiment, seen in FIG. 1.

DETAILED DESCRIPTION OF THE PREFERRED EMBODIMENTS

Figure 1:
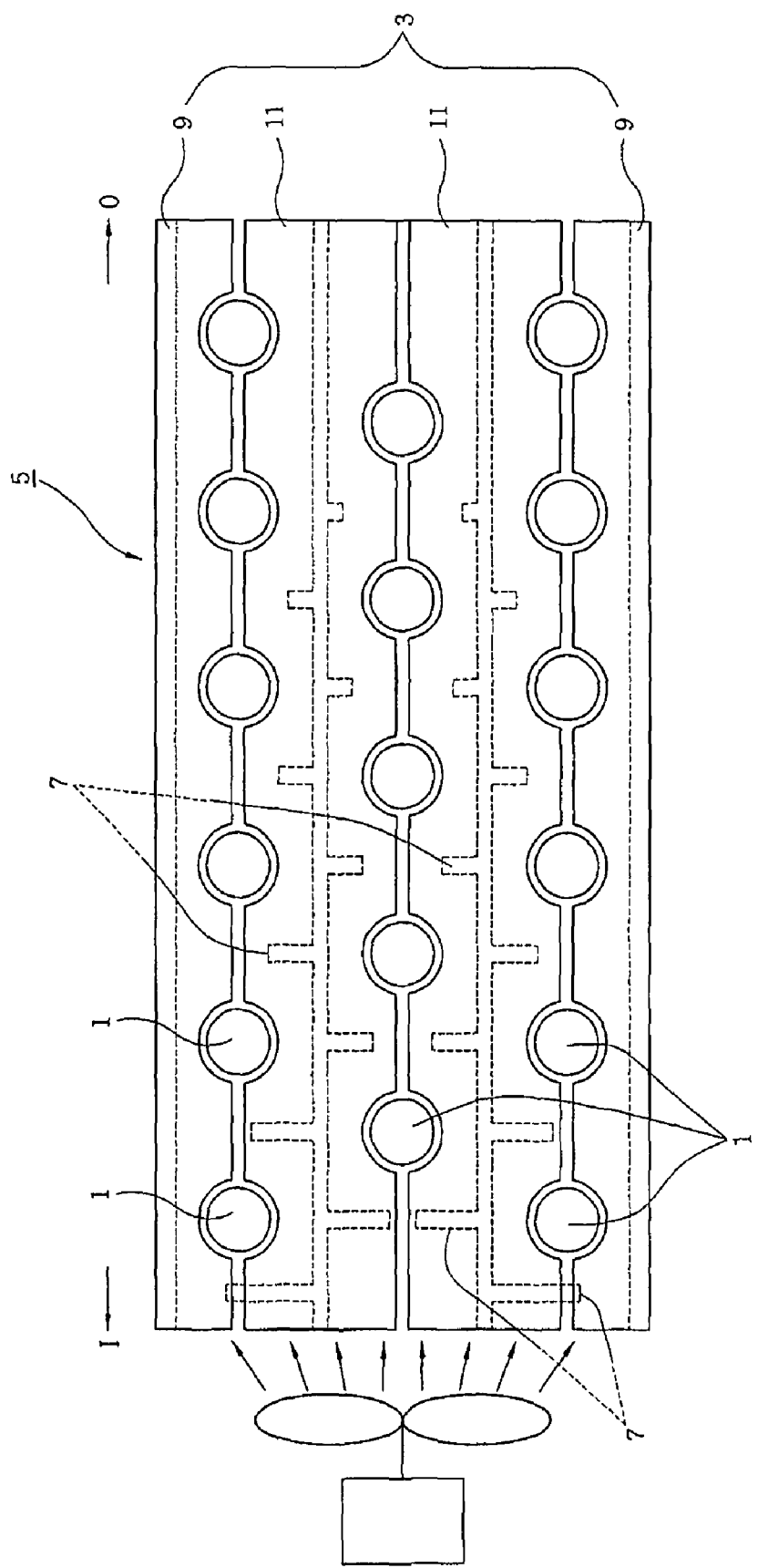
FIG. 1 is a sectional view of a heat exchanger structure for battery modules according to a first embodiment of the present invention.
Figure 2:
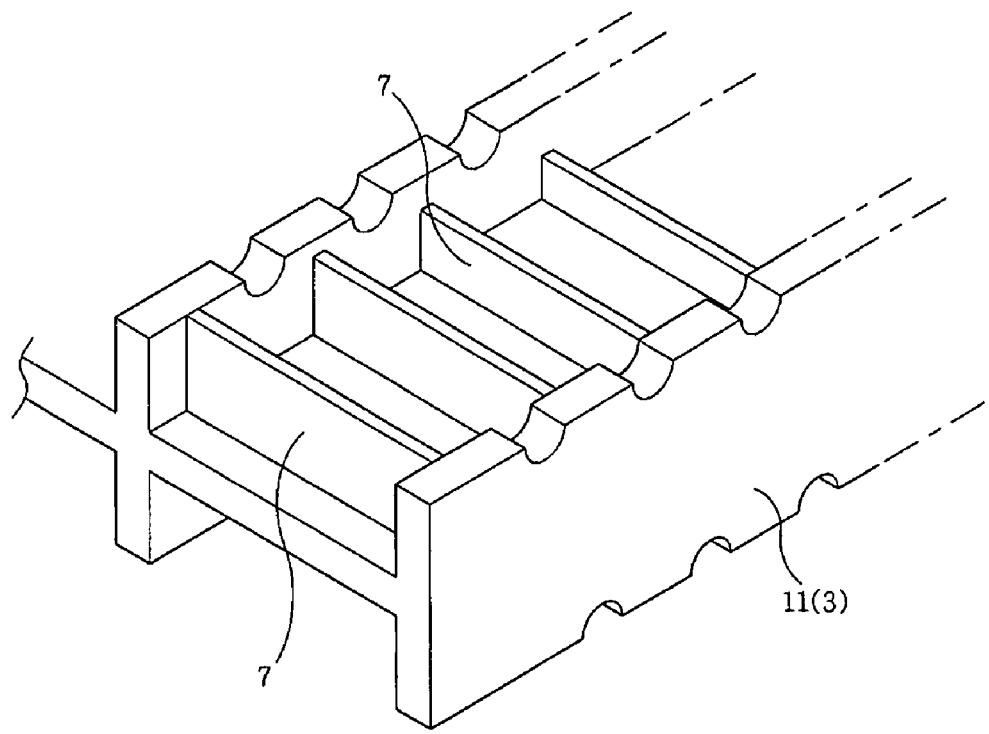
FIG. 2 is a perspective view illustrating fins formed on an intermediate holder part shown in FIG. 1.

Referring to FIGS. 1 and 2, battery modules 1 are disposed in a holder 3 to constitute a battery package 5. In a heat exchanger structure for the battery modules 1 according to a first embodiment of the present invention, a fan blows air to either one or both sides of the battery package so that the air carries out heat exchange with each battery module 1, thereby cooling or heating the battery modules 1. The holder 3 is provided with a plurality of fins 7, the height of which decreases from an air inlet I to an air outlet O of the battery package 5.

In FIG. 1, the holder 3 includes holder cover parts 9 forming upper and lower contours of the battery package 5, and a plurality of intermediate holder parts 11 disposed between the holder cover parts 9. The fins 7 protrude from the intermediate holder parts 11.

As shown in FIG. 10, in a modification to the embodiment of FIG. 1, one of upper and lower holder cover parts 9 is also provided with fins 7, and the intermediate holder parts 11 are provided with fins 7 that protrude in the same direction as those of the holder cover part 9. As a result, the fins protrude from only one side of each row of battery modules.

Figure 3:
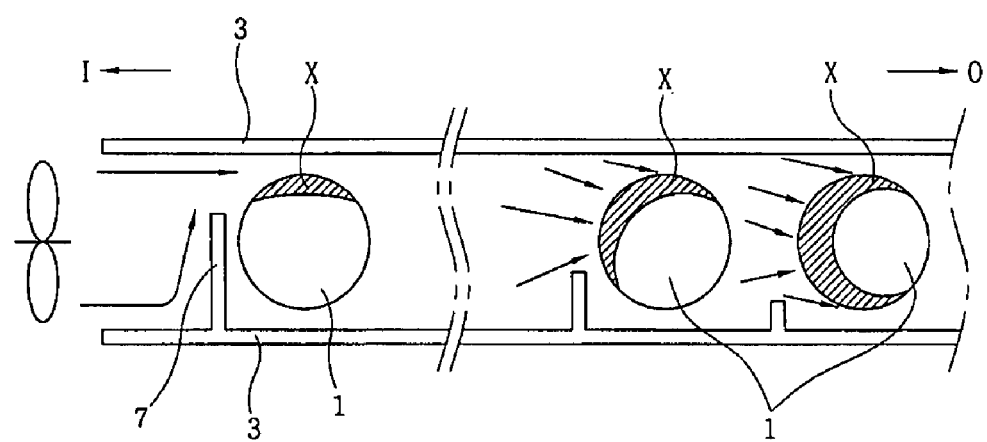
FIG. 3 is a sectional view illustrating the operation of the heat exchanger structure of FIG. 1.

Referring to FIG. 3, the fin 7 located closest to the inlet I is tall, and thus the battery module 1 nearest the air inlet I of the battery package 5 has a relatively small region X in contact with, and carrying out heat exchange with, the air.

Moving toward the air outlet O, the fins 7 are gradually shorter, so that the region X of the battery module 1 that contacts the air increases, so as to thereby carry out more efficient heat exchange therewith. Accordingly, the air exchanges a similar amount of heat with all of the battery modules 1.

FIG. 4 illustrates a heat exchanger structure for battery modules according to a second embodiment of the present invention, in which the battery modules 1 are disposed in a holder 3 to constitute a battery package 5. The heat exchanger serves to cool or heat the battery modules by blowing air with a fan to either one or both sides of the battery package 5 so that the air carries out heat exchange with individual battery modules 1. The holder 3 is provided with a plurality of fins 7 protruding from an upper side and a lower side of the battery modules 1. The fins 7 of either the upper side or the lower side decrease in height from an air inlet I to an air outlet O, and the fins 7 of the other side increase in height from the air inlet I to the air outlet O.

In the embodiment illustrated in FIG. 4, the upper fins 7-1 decrease in height, and the lower fins 7-2 increase in height. The heights of the fins 7-1 are smaller than the distance from the wall of the holder from which the fins 7-1 protrude, to a far point of the corresponding battery module 1, and are greater than the distance from the wall to a near point of the corresponding battery module 1. The heights of the lower fins 7-2 are smaller than the distance from the wall of the holder from which the fins 7-2 protrude, to a near point of the corresponding battery module 1. As a result, the air channel defined between the fins 7 and the battery modules 1 becomes gradually narrower from the air inlet I to the air outlet O.

In such a structure, as shown in FIG. 4, the battery modules 1 nearest the air inlet I come into little contact with the air, whereas the battery modules 1 come into contact in a gradually larger area with the air from the inlet I toward the outlet O. The air channel defined by the fins 7 and the battery modules 1 is gradually reduced in cross sectional area to thereby increase the flow rate of the air. As a result, moving toward the outlet O, the air flows rapidly while having a greater contact area with the battery modules 1, enabling more heat exchange, such that all of the battery modules 1 are evenly cooled.

FIG. 5 illustrates a heat exchanger structure for battery modules according to a third embodiment of the invention, in which the battery modules 1 are disposed in a holder 3 to constitute a battery package 5. The heat exchanger cools or heats the battery modules by blowing air with a fan to either one or both sides of the battery package 5 so that the air carries out heat exchange with each battery module 1. The holder 3 is provided with a plurality of fins 7, which gradually increase in distance from the battery modules 1, from an air inlet I toward an air outlet O of the battery package 5.

That is, the air introduced into the air inlet I strikes the fin 7, and flows over the fin 7 along the back face thereof into a space defined between the battery module 1 and the fin 7. Moving toward the air outlet O, the amount of air flowing into the space increases to widen the contact area with the battery modules 1, thereby forming conditions suitable for heat exchange. Accordingly, due to the airflow from the air inlet I to the air outlet O, the battery modules 1 disposed along the airflow path are cooled or heated to the same level as a whole.

The fins 7 described above with reference to FIGS. 1-5 and 10 can have various cross-sectional shapes, such as, for example and without limitation, those illustrated in FIGS. 6 to 9.

Figure 6:
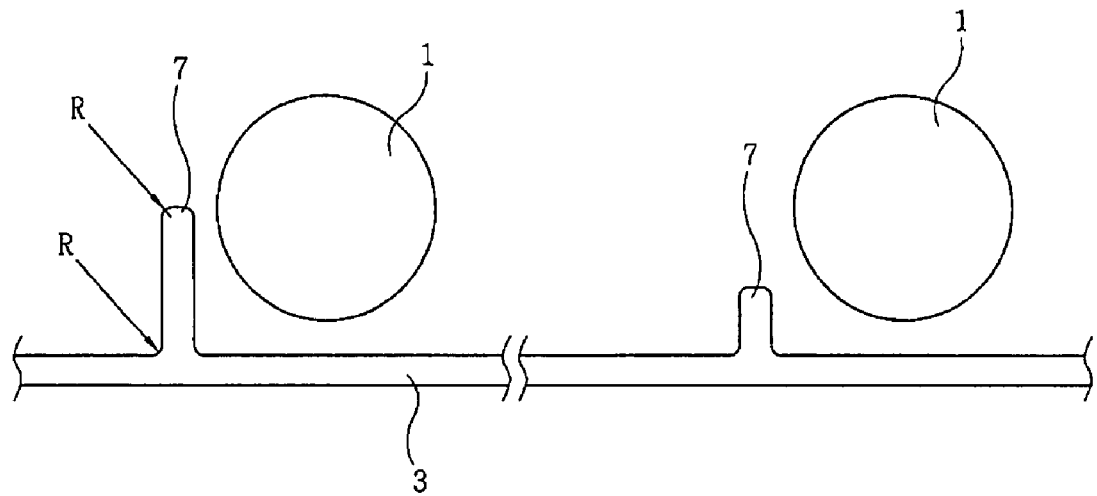
FIGS. 6 to 9 are views illustrating various exemplary sectional shapes of fins used in the heat exchangers of FIGS. 1 to 5.

In FIG. 6, each fin 7 is linear, and is chamfered at its corners in consideration of easy machining and strength.

Figure 7:
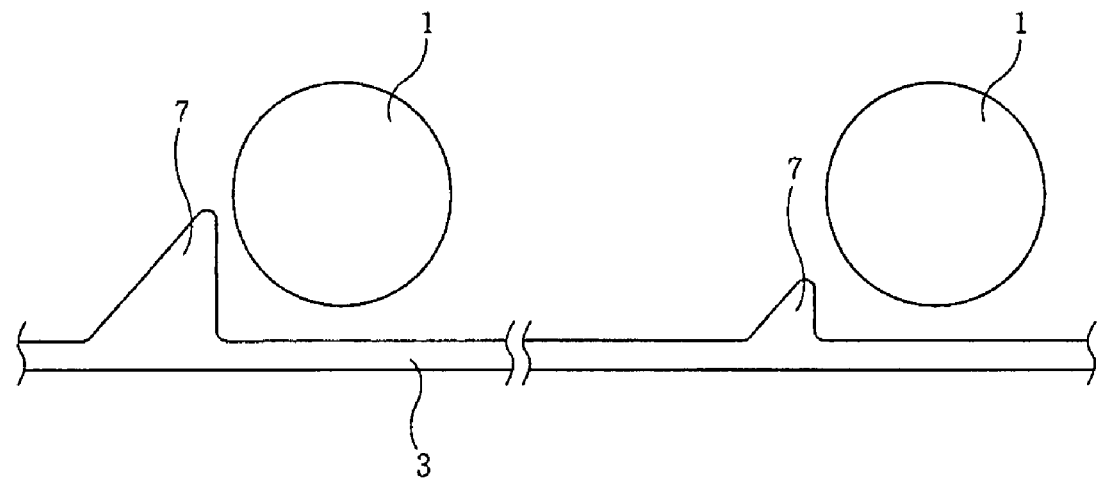

In FIG. 7, each fin 7 is triangular, with an inclined upstream side.

Figure 8:
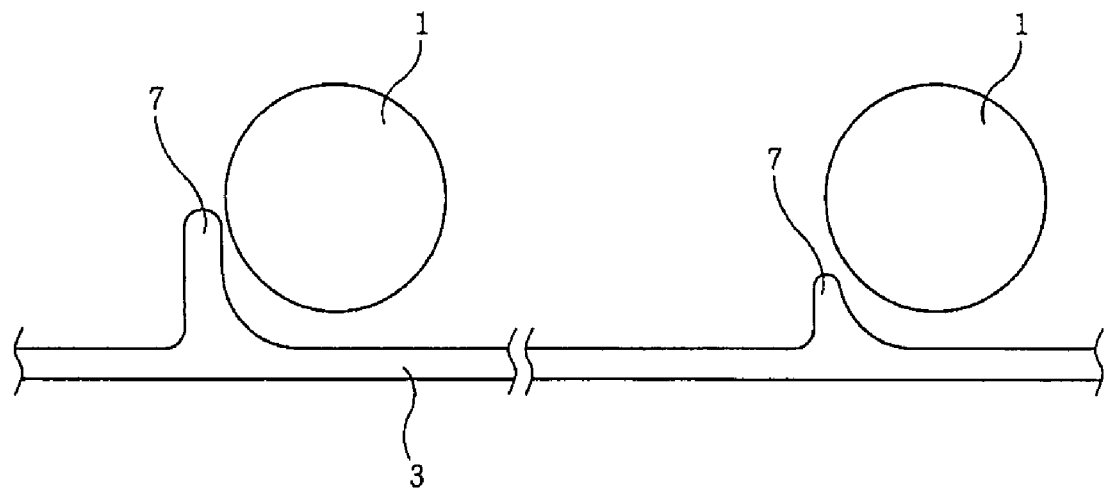

In FIG. 8, each fin 7 is curved to correspond to the outer contour of the battery modules 1 at its downstream side.

Figure 9:
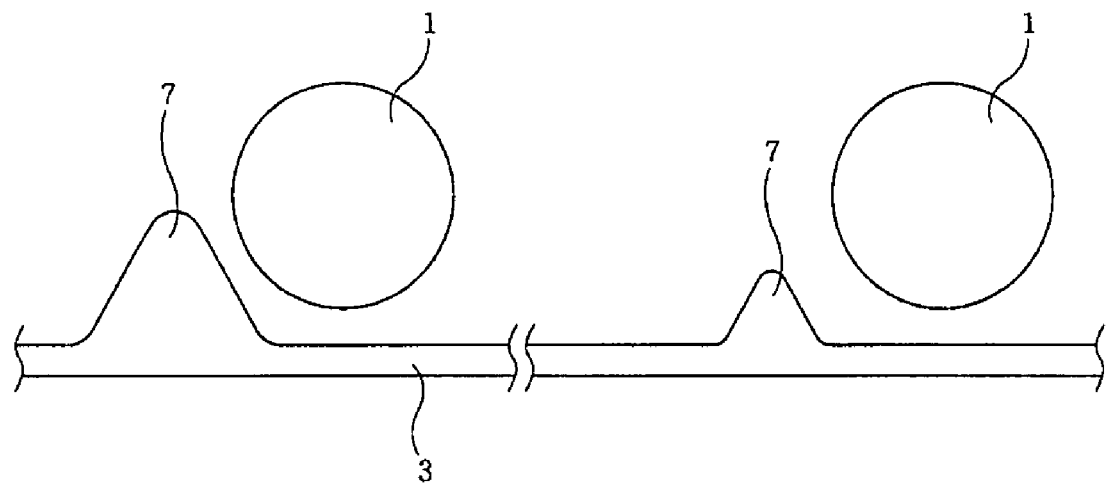

In FIG. 9, each fin 7 is triangular, with an inclined upstream side and a declined downstream side.

The shape of each fin 7 can be selected by a person of ordinary skill in the art based on the teachings herein, considering the cooling or heating characteristics of the battery modules 1 and the workability of the holder 3 of the battery package 5 to which the invention is adapted in practice.

As set forth above, according to the present invention, air is properly controlled so as to uniformly cool or heat the battery modules to thereby secure smooth and stable operation of the battery package.

While the invention has been described in conjunction with various embodiments, the invention is not limited thereto, and accordingly, many alternatives, modifications and variations will be apparent to persons skilled in the art in light of the foregoing detailed description. The foregoing description is intended to embrace all such alternatives and variations that fall within the spirit and broad scope of the appended claims.

What is claimed is:

1. A heat exchanger structure for a battery package, the battery package comprising battery modules disposed in a holder, the heat exchanger comprising a fan to blow air from an upstream part to a downstream part of the battery package;

wherein the holder comprises a plurality of fins, configured such that an air contact area of the battery modules at the upstream part is smaller than an air contact area of the battery modules at the downstream part;

wherein each fin defines a length in a direction substantially perpendicular to a direction from the upstream part to the downstream part, wherein the lengths of the fins at the upstream part are longer than the lengths of the fins at the downstream part; and wherein the fins are disposed at a first side of the battery modules, the structure further comprising additional fins at a second side of the battery modules, wherein each additional fin defines a length in the direction substantially perpendicular to the direction from the upstream part to the downstream part, wherein the lengths of the additional fins at the upstream part are shorter than the lengths of the additional fins at the downstream part.

2. The heat exchanger structure according to claim 1, wherein the holder comprises holder cover parts at outer surfaces of the battery package, and one or more intermediate holder parts disposed between the holder cover parts, and wherein the fins are disposed on the intermediate holder parts and/or the holder cover parts.

3. The heat exchanger structure according to claim 1, wherein the lengths of the fins are shorter than a distance from a first wall of the holder from which the fins protrude, to a far point of corresponding battery modules, and are longer than a distance from the first wall to a near point of the corresponding battery modules, wherein the lengths of the additional fins are shorter than a distance from a second wall of the holder from which the additional fins protrude, to a near point of corresponding battery modules, and wherein an air channel defined between the fins, the additional fins, and the battery modules becomes gradually narrower from the upstream part to the downstream part.

4. The heat exchanger structure of claim 1, wherein the fins at the upstream part are closer to corresponding ones of the battery modules than fins at the downstream part.

5. The heat exchanger structure of claim 1, wherein each fin defines a substantially rectangular cross-section.

6. The heat exchanger structure of claim 1, wherein each fin comprises an inclined surface on an upstream side of the fin.

7. The heat exchanger structure of claim 1, wherein each fin comprises a declined surface on a downstream side of the fin.

8. The heat exchanger structure of claim 1, wherein each fin comprises an inclined surface on an upstream side of the fin and a declined surface on a downstream side of the fin.

* * * * *